United States Patent [19]

Krasnov

[11] 3,884,236

[45] May 20, 1975

[54] METHOD OF GLAUCOMA TREATMENT

[76] Inventor: Mikhail M. Krasnov, ulitsa Usievicha 11, kv. 83, Moscow, U.S.S.R.

[22] Filed: Nov. 12, 1973

[21] Appl. No.: 414,774

Related U.S. Application Data

[63] Continuation of Ser. No. 295,468, Oct. 6, 1973, abandoned.

[30] Foreign Application Priority Data

Oct. 28, 1971 U.S.S.R............................. 1712090

[52] U.S. Cl. .............................................. 128/303.1
[51] Int. Cl............................................ A61b 17/36
[58] Field of Search.................. 128/303.1, 395, 396

[56] References Cited
UNITED STATES PATENTS 3,481,340  12/1969  McKnight et al................... 128/395
3,703,176  11/1972  Vassiladis et al. ............... 128/303.1
3,710,798  1/1973   Bredemeier...................... 128/303.1

Primary Examiner—Lawrence W. Trapp
Attorney, Agent, or Firm—Holman & Stern

[57] ABSTRACT

A method of glaucoma treatment utilizing the action produced by a laser beam, wherein the anterior chamber angle of a diseased eye is acted upon by laser-produced irradiation having wavelength in the range 4,500 A. to 10,600 A. and the power output from 0.1 W to $10^7$ W, the pulse duration being from $10^{-8}$ sec. to 5.0 sec., the treatment being performed under biomicroscopic control with the help of a gonioscope, the number of laser bursts per single treatment session being not less than five.

2 Claims, No Drawings

METHOD OF GLAUCOMA TREATMENT

This application is a continuation of application Ser. No. 295,468, filed Oct. 6, 1973, now abandoned.

BACKGROUND OF THE INVENTION

The present invention relates to medicine, and, more particularly, it relates to methods of glaucoma treatment.

At present, there are two known methods of glaucoma treatment, i.e., with administration of medicaments and by surgery.

A method of glaucoma treatment utilizing a laser beam has not been disclosed heretofore.

SUMMARY OF THE INVENTION

In accordance with the present invention, there is disclosed a method wherein the region of the anterior chamber angle of a diseased eye is acted upon, with the help of a gonioscope and under a biomicroscopic control, by a laser beam of wavelength within the range from 4,500 A. to 10,600 A, having the power from 0.1 W to $10^7$ W, the pulse duration being from $10^{-8}$ sec. to 5.0 sec., with the beam being focused into a spot 0.05 mm to 0.7 mm in diameter, the number of bursts per single treatment session being no less than five.

The best results have been attained by employing at the source of the laser beam a Q-switched pulsed laser unit with the wavelength ranging from 6,943 A. to 10,600 A., the pulse duration being from $10^{-7}$ sec. to $10^{-8}$ sec. and the power output from $10^6$ W. to $10^7$ W, with the beam being focused into a spot 0.1 mm to 0.7 mm in diameter, the number of bursts per single treatment session being no less than five.

The herein disclosed method provides for effecting micropuncture of the filtering zone of the anterior chamber angle of a diseased eye without any surgical intervention in the eyeball. In this way the outflow of the intraocular fluid is substantially improved, and the intraocular pressure is brought down. Micropuncture of the anterior chamber angle of an eye can be effected with various lasers irradiating electromagnetic waves within the visible and infra-red ranges, the wavelength being from 4,500 A. to 10,600 A. and the power output from 0.1 W to $10^7$ W, the pulse duration being from $10^{-8}$ sec. to 5.0 sec.

The direct the laser beam into the anterior chamber angle of the eye, use is made of illuminating and optical devices. It is advisable to employ for this purpose a commonly known slit lamp. It is further possible to adapt a laser unit to an operating microscope. A commonly known gonioscope is employed to inspect visually the anterior chamber angle of the eye, to supervise aiming of the laser beam and to evaluate the effect produced by the irradiation.

The application of the herein disclosed laser beam irradiation, which is herein proposed to be called "laser-puncture," results in formation of tiny apertures in the filtering zone, for which purpose both pulsed and gas lasers are suitable.

The herein disclosed laser beam treatment does not require any specific premedication of the patient, except for conventional superficial anaesthesia of the cornea by administering several drops of an anaesthestic solution, e.g. 0.5 % pontocain, into the eye. The patient is in a sitting position throughout the treatment. Under gonioscopic control a pilot light is directed at the desired point in the anterior chamber angle of the eye. The aiming of the light is supervised with the help of either an operating microscope, or preferably, with the use of a slit lamp. The accuracy of the aiming is monitored by the appearance of a gas bubble at the target spot of the anterior chamber corner after a laser burst, the laser beam being prefocused into a spot 0.05 to 0.70 mm in diameter in the focal plane of the slit lamp or of the microscope, at the centre of the image. Not less than five laser bursts should be effected per single treatment session. The treatment sessions are to be repeated depending on the intraocular pressure values.

Experiments have been carried out on the eyes of fifty Shinshilla rabbits to develop the procedure of irradiation of the anterior chamber angle of an eye and to select doses that should be harmless for the eye. The anterior chamber angle and the adjoining regions (the iris, the crystalline lens and the anterior part of the ciliary body) were treated with argon laser beams, both with and without Q-switching, within the range of doses from 01. joule to 0.3 joule in the case of a ruby laser without Q-switching, or from 0.05 joule to 0.20 joule in the case of a Q-switched laser, the output power of the argon laser being up to 0.1 W. De-pigmentation seats and gas bubbles were produced in the anterior chamber angle. The rabbits were put under observation within a 6 months' period following the treatment, and no adverse changes caused by the action of the laser beam upon the anterior chamber angle were found, provided that the doses had been as hereinfore described and the aiming had been accurate.

Irradiation of the iris resulted in some depigmentation, and, occasionally, in tissue defects. It has also been found that Q-switched laser bursts might result in rupture of the lens capsule or of the iris vessels, when the laser beam is focused at the advanced surface of the lens. Otherwise no adverse effects of the irradiation with Q-switched and non-Q-switched ruby lasers within the abovespecified range of doses were registered.

Irradiation with an argon laser resulted in burning of the iris and of the adjoining structures to different depths.

The experiments that have been carried out on the eyes of the rabbits have proved adequate safety and complete acceptability of the herein disclosed laser treatment for clinical purposes.

The herein disclosed method of glaucoma treatment has been clinically treated on the eyes of ten patients, with a fairly long follow-up (post-treatment observation) period, as long as two years and over.

The patients had their corneas anaesthetized, whereafter five to ten bursts of laser energy were delivered into the anterior chamber angle of the diseased eye, the focal spot diameter of the beam being from 0.05 mm to 0.70 mm and the power output being from 0.1 to 1.0 W in the cases when an argon gas laser was employed, or else from $10^6$ W to $10^7$ W in the cases when the laser employed was a pulsed Q-switched ruby laser. Following the laser treatment, the intraocular pressure of all the patients fell by 8 to 10 mm Hg. The duration of the hypotensive effect ranged from two weeks to six months. Thereafter similar treatment sesions were repeated two to 10 times, to maintain a stable hypotensive effect for periods from 18 to 20 months.

Most of the patients did not have to use eyedrops in the periods in between the treatment sessions.

The fall of the intraocular pressure usually becomes apparent 1 to 4 days after the treatment and attains its maximum by the fifth or sixth day. Better outflow facility (the "C" coefficient) was registered by tonography. No complications caused by the laser irradiation have ever been encountered.

The employment of argon lasers resulted in considerable heating of the tissue of the anterior chamber angle, which caused small areas of burning and, consequently, inflammation. The action of irradiation by Q-switched lasers is relatively free from the above drawback, and hence these lasers are to be preferred.

Pulses of Q-switched laser energy of the duration from $10^{-7}$ sec. to $10^{-8}$ sec. and power output from 0.1 joule to 0.2 joule are most suitable for the purpose. The outcome of our experiments, as well as the use of the herein disclosed method of treating glaucoma patients have provided that Q-switched irradiation focused into a spot 0.1 to 0.7 mm in diameter yields good therapeutic effect with minimal inflammation. The procedure is easily tolerated and can safely be performed in outpatient departments. The hypotensive effect also proved to be stronger, as compared to that of the treatment with a pulsed laser without Q-switching or with a gas laser.

What is claimed is:

1. A method of glaucoma treatment using a laser means providing bursts of a pulsed coherent beam light wherein the anterior chamber angle of an eye is acted upon by said beam containing wavelengths from about 4,500 A. to 10,600 A. the power output of said laser means being from about 0.1 W to $10^7$ W, said beam having a pulse duration of from about $10^{-8}$ sec. to about 5.0 sec., with said beam being focused into a spot about 0.05mm to 0.70mm in diameter, said treatment being performed under conventional gonioscopic control means, wherein the number of said laser bursts per single session of said treatment being not less than five.

2. A method of glucoma treatment using a pulsed Q-switched laser means, said means producing bursts of a coherent light beam containing wavelengths from about 6,943 A. to 10,600 A., said pulse duration being from about $10^{-7}$ sec. to $10^{-8}$ sec. the power output of said laser means being from about $10^6$ W to $10^7$ W, and said beam being focused into a spot about 0.1mm to 0.7mm in diameter, wherein the number of said bursts per single session of said treatment is not less than five.

* * * * *